United States Patent
Kwon et al.

(10) Patent No.: US 9,634,804 B2
(45) Date of Patent: Apr. 25, 2017

(54) METHOD AND APPARATUS FOR STABLE SIGNAL DEMODULATION IN COMMUNICATION SYSTEM

(71) Applicant: SAMSUNG ELECTRONICS CO., LTD., Suwon-si (KR)

(72) Inventors: Ui Kun Kwon, Hwaseong-si (KR); Chang Soon Park, Chungju-si (KR); Chi Sung Bae, Yongin-si (KR); Joon Seong Kang, Suwon-si (KR); Sang Joon Kim, Hwaseong-si (KR); Seung Keun Yoon, Seoul (KR); Chang Mok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/956,683

(22) Filed: Dec. 2, 2015

(65) Prior Publication Data
US 2016/0087760 A1 Mar. 24, 2016

Related U.S. Application Data

(62) Division of application No. 14/172,197, filed on Feb. 4, 2014, now Pat. No. 9,231,735.

(30) Foreign Application Priority Data

Jun. 26, 2013 (KR) .......... 10-2013-0073918

(51) Int. Cl.
*H04L 1/08* (2006.01)
*H04L 1/00* (2006.01)
*H04L 25/49* (2006.01)

(52) U.S. Cl.
CPC .......... *H04L 1/08* (2013.01); *H04L 1/0091* (2013.01); *H04L 25/49* (2013.01)

(58) Field of Classification Search
CPC .......... H04L 1/08; H04L 25/49; H04L 1/0091
See application file for complete search history.

(56) References Cited

U.S. PATENT DOCUMENTS

| | | | |
|---|---|---|---|
| 5,274,670 A | 12/1993 | Serizawa et al. | |
| 5,335,250 A | 8/1994 | Dent et al. | |
| 5,909,465 A | 6/1999 | Bottomley et al. | |
| 6,269,116 B1 * | 7/2001 | Javerbring | H04L 25/03038 375/227 |
| 6,810,074 B1 | 10/2004 | Kim et al. | |
| 2007/0195444 A1 | 8/2007 | Annampedu | |

(Continued)

FOREIGN PATENT DOCUMENTS

| | | |
|---|---|---|
| JP | 2006-261826 A | 9/2006 |
| JP | 2008-103845 A | 5/2008 |

(Continued)

*Primary Examiner* — Kenneth Lam
(74) *Attorney, Agent, or Firm* — NSIP Law

(57) ABSTRACT

A method and apparatus provide for stable signal demodulation in a communication system. The method and apparatus includes including detecting an erroneous demodulation value based on backward-demodulation of received signals, using a difference between a received signal to be demodulated and a preceding signal of the received signals and correcting the error demodulation value. Alternatively, backward-demodulation is used to confirm received signals.

6 Claims, 12 Drawing Sheets

(56) References Cited

U.S. PATENT DOCUMENTS

2010/0266053 A1    10/2010   Sakamoto et al.
2013/0010849 A1     1/2013   Shimizu et al.

FOREIGN PATENT DOCUMENTS

| | | |
|---|---|---|
| JP | 2008-271484 A | 11/2008 |
| KR | 10-2007-0082373 A | 8/2007 |
| KR | 10-2010-0089697 A | 8/2010 |

* cited by examiner

| Data detection($\hat{d}_n$) | Metric |
|---|---|
| 0 | $(B_n - B_{n-1}) < N\_thr\_dd$ |
| $\hat{d}_n = \hat{d}_{n-1}$ | $N\_thr\_dd < (B_n - B_{n-1}) < P\_thr\_dd$ |
| 1 | $P\_thr\_dd < (B_n - B_{n-1})$ |

METHOD AND APPARATUS FOR STABLE SIGNAL DEMODULATION IN COMMUNICATION SYSTEM

CROSS-REFERENCE TO RELATED APPLICATION(S)

This application is a divisional of application Ser. No. 14/172,197, filed on Feb. 4, 2014, which claims the benefit under 35 U.S.C. §119(a) of Korean Patent Application No. 10-2013-0073918, filed on Jun. 26, 2013, in the Korean Intellectual Property Office, the entire disclosure of which is incorporated herein by reference for all purposes.

BACKGROUND

1. Field

The following description relates to a method and apparatus for stable signal demodulation in a communication system.

2. Description of Related Art

Use of a sensor network to gather information is rapidly becoming widespread based on the fast improvement and commercialization of wireless network technology. Technological standardization of protocols that are used for wireless communication is also being actively conducted by entities such as the Institute of Electrical and Electronics Engineers (IEEE). In particular, standardization of wireless communication protocols such as Bluetooth, IEEE 802.15.4 and ZigBee is being performed. Such standardization helps devices to communicate with one another because in order for successful communication to occur between devices, it is necessary for the devices to agree on ways to transmit information using wireless signals and subsequently obtain the information from the signals.

A wireless sensor device may be used in various fields for many potential applications. For example, wireless sensor devices may be used in fields including home security, medicine, mobile healthcare, chemical and biological defect monitoring, breakdown and damage diagnosis for machinery, environmental monitoring, sensing information associated with natural disasters, intelligent logistics management, real-time security, remote observation, and the like. A wireless sensor is able to use sensor technology to gather information, and then use wireless communications technology to transmit the gathered information to be analyzed and interpreted.

Various wireless sensor networks and local area networks (LANs) require compact-sized sensors. For example, limited physical space may be available for sensors, and hence it may be necessary to use sensors that require minimal space. Also, for practical operation of a number of sensors, meeting low power and low complexity requirements is necessary. For example, sensors may have limited access to power, such as if they use a battery as a power source, and hence the sensors may need to ensure that they use a controlled amount of power to ensure that the power stored in the battery is not depleted too quickly. Similarly, if the sensors are too complicated, the infrastructure needed to support them may not be practical.

In particular, a sensor to be attached to or mounted on a human body needs to meet the low power and low complexity requirements as discussed above in a wireless body area network (WBAN), in which communication with an adjacent mobile device or a sensor of another human body is performed wirelessly.

To meet low power and low complexity requirements, a super-low power radio frequency (RF) structure may be used in lieu of a high power RF structure. However, the use of a super-low power radio frequency (RF) structure may lead to problems when trying to perform stable demodulation of a received signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a signal demodulation method includes demodulating received signals using a difference between a received signal to be demodulated and a preceding signal of the received signal, detecting an erroneous demodulation value based on backward-demodulation of the received signals, and correcting the erroneous demodulation value.

The demodulating may include determining a demodulation value of the received signal to be demodulated as a first demodulation value when a differential value is less than a first threshold, the differential value corresponding to a difference between an intensity of the received signal to be demodulated and an intensity of the preceding signal, determining the demodulation value of the received signal to be demodulated as a second demodulation value when the differential value is greater than a second threshold, and determining the demodulation value of the received signal to be demodulated to be a demodulation value of the preceding signal when the differential value is a value between the first threshold and the second threshold.

The detecting may include identifying, from the received signals, a received signal of which a demodulation value obtained through forward-demodulation differs from a demodulation value obtained through backward-demodulation, and detecting the erroneous demodulation value using a reliability level of the received signal.

The detecting may include identifying a bit transition received signal of which the demodulation value of the received signal to be demodulated differs from the demodulation value of the preceding signal, determining whether a conflict occurs, and detecting the erroneous demodulation value using a reliability level of a currently received signal and a reliability level of the bit transition received signal when the conflict occurs, wherein, when the conflict occurs, the erroneous demodulation value is determined to be one of a demodulation value obtained by forward-demodulating each received signal, starting from the bit transition received signal to a preceding signal of the currently received signal, and a demodulation value obtained by backward-demodulating each received signal, starting from the bit transition received signal to the preceding signal of the currently received signal.

The identifying of the bit transition received signal may include determining the received signal to be demodulated to be the bit transition received signal when the demodulation value of the received signal to be demodulated differs from the demodulation value of the preceding signal, and storing an index and a differential value of the bit transition received signal.

The storing may include updating an index and a differential value of a previous bit transition received signal with the index and the differential value of the bit transition received signal.

The determining whether the conflict occurs may include verifying whether a demodulation value of the currently received signal is equal to the demodulation value of the preceding signal when the differential value of the currently received signal is less than the first threshold or is greater than the second threshold, and determining that the conflict occurs when the demodulation value of the currently received signal is equal to the demodulation value of the preceding signal.

The detecting of the erroneous demodulation value using the reliability level may include comparing a differential value of the bit transition received signal and a differential value of the currently received signal, and detecting the erroneous demodulation value based on a result of the comparing.

The detecting of the erroneous demodulation value based on the result of the comparing may include determining the demodulation value obtained by forward-demodulating each received signal, starting from the bit transition received signal to a preceding signal of the currently received signal to be an erroneous demodulation value when the differential value of the currently received signal is greater than the differential value of the bit transition received signal.

The correcting may include changing the erroneous demodulation value from a current value to another value.

The correcting may include changing the demodulation value obtained by forward-demodulating each received signal, starting from the bit transition received signal to the preceding signal of the currently received signal, to a demodulation value obtained by backward-demodulating each received signal, starting from the bit transition received signal to the preceding signal of the currently received signal, when the differential value of the currently received signal is greater than the differential value of the bit transition received signal.

In another general aspect, a signal demodulation method includes demodulating received signals using a difference between a received signal to be demodulated and a preceding signal of the received signal, identifying a bit transition received signal of which a demodulation value of the received signal to be demodulated differs from a demodulation value of the preceding signal, determining whether a conflict occurs, detecting an erroneous demodulation value using a reliability level of a currently received signal and a reliability level of the bit transition received signal when the conflict occurs, and correcting the erroneous demodulation value.

In yet another general aspect, a non-transitory computer-readable storage medium stores a program for signal demodulation, the program comprising instructions for causing a computer to perform the first method presented above.

In yet another general aspect, a signal demodulation apparatus includes a signal demodulator configured to demodulate received signals using a difference between a received signal to be demodulated and a preceding signal of the received signal, an erroneous demodulation value detector configured to detect an erroneous demodulation value based on a backward-demodulation of the received signals, and an erroneous demodulation value corrector configured to correct the erroneous demodulation value.

The signal demodulator may be configured to determine a demodulation value of the received signal to be demodulated as a first demodulation value when a differential value is less than a first threshold, the differential value corresponding to a difference between an intensity of the received signal to be demodulated and an intensity of the preceding signal, determine the demodulation value as a second demodulation value when the differential value is greater than a second threshold, and determine the demodulation value of the received signal to be demodulated to be a demodulation value of the preceding signal when the differential value is a value between the first threshold and the second threshold.

The erroneous demodulation value detector may include a backward demodulator configured to backward-demodulate the received signals, an identifier configured to identify, from the received signals, a received signal of which a demodulation value obtained through forward-demodulation differs from a demodulation value obtained through backward-demodulation, and a detector configured to detect the erroneous demodulation value using a reliability level of the received signal.

The erroneous demodulation value detector may include a bit transition received signal identifier configured to identify a bit transition received signal of which the demodulation value of the received signal to be demodulated differs from the demodulation value of the preceding signal, a conflict determiner configured to determine whether a conflict occurs, and a detector configured to detect the erroneous demodulation value using a reliability level of a currently received signal and a reliability level of the bit transition received signal when the conflict occurs, wherein, when the conflict occurs, the erroneous demodulation is determined to be one of a demodulation value obtained by forward-demodulating each received signal, starting from the bit transition received signal to a preceding signal of the currently received signal, and obtained by backward-demodulating each received signal, starting from the bit transition received signal to the preceding signal of the currently received signal.

In yet another general aspect, a signal demodulation apparatus includes a signal demodulator configured to demodulate received signals using a difference between a received signal to be demodulated and a preceding signal of the received signal, an erroneous demodulation value detector configured to detect that the demodulation value is correct, based on a backward-demodulation of the received signals, and an erroneous demodulation value corrector configured to output that the demodulated value is correct.

The signal demodulator may be configured to determine a demodulation value of the received signal to be demodulated as a first demodulation value when a differential value is less than a first threshold, the differential value corresponding to a difference between an intensity of the received signal to be demodulated and an intensity of the preceding signal, determine the demodulation value as a second demodulation value when the differential value is greater than a second threshold, and determine the demodulation value of the received signal to be demodulated to be a demodulation value of the preceding signal when the differential value is a value between the first threshold and the second threshold.

The error demodulation value detector may include a backward demodulator configured to backward-demodulate the received signals, an identifier configured to identify, from the received signals, a correct signal for which a demodulation value obtained through forward-demodulation is the same as a demodulation value obtained through backward-demodulation, and a detector configured to detect that the demodulation value is correct when the identifier identifies a correct signal.

Other features and aspects will be apparent from the following detailed description, the drawings, and the claims.

Figure 1:
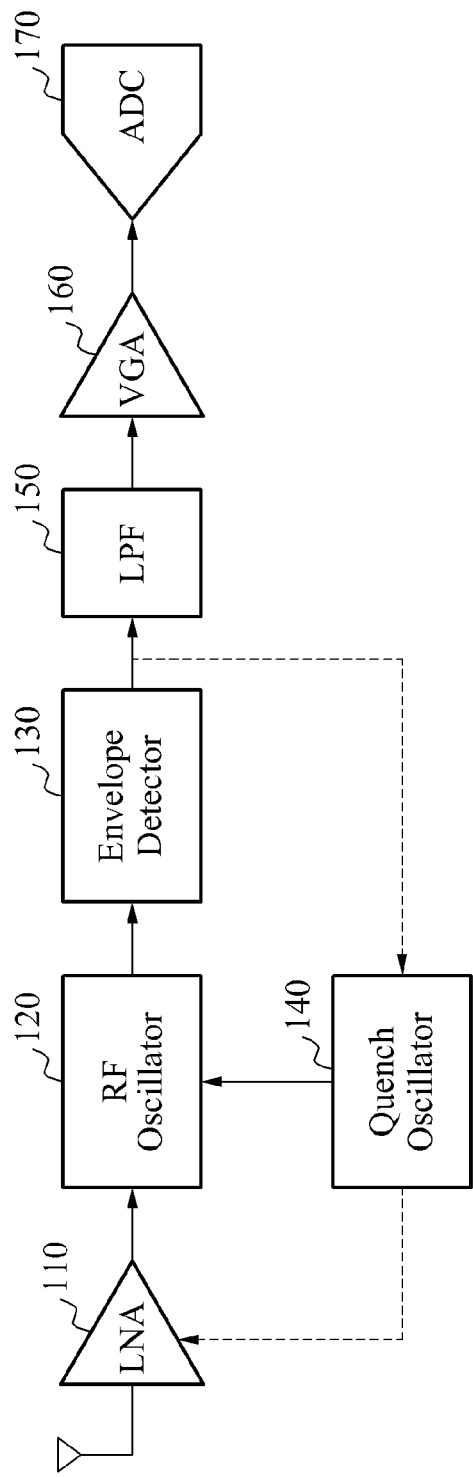
FIG. 1 is a block diagram illustrating an example of a conventional super-regenerative receiver.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In the following detailed description, with respect to information transmitted to a receiver, the term "normal" refers to received data that is in accord with the intended data sent by the sender. Hence, normal data refers to correctly transmitted data, such that the demodulated data is not incorrect or erroneous. Abnormal data refers to data that is not transmitted or demodulated correctly. For example, noise may lead to the propagation of erroneous, abnormal data. In transmitting and receiving data, it is a goal to maximize the occurrence of normal data and minimize the occurrence of abnormal data to help ensure that the demodulated data is as correct as possible in order to reduce the occurrence of errors or the need for retransmission or other forms of error correction that slow transmission.

Sensor devices to be installed in a wireless sensor network and a local area network (LAN), in order to be practical, have the requirements that they must be designed to have a compact size. Additionally, sensor devices in a wireless sensor network should be designed to have low power requirements and a structured that is of low complexity.

In general, a superheterodyne radio frequency (RF) structured receiver may use an intermediate frequency band to improve performance, for example, sensitivity, rather than converting a received signal from a high-frequency band directly to a base band. However, complexity, costs, and power consumption may also increase. Hence, in order to use a superheterodyne RF structure receiver in the context of a wireless sensor network, a the receiver may be confirmed to keep complexity, costs, and power consumption at manageable levels while continuing to achieve the performance advantages provided by the superheterodyne approach.

In an RF portion, a modem technology based on a superheterodyne RF structure scheme requires a greater amount of power when compared to a digital base band portion. For example, in a case of a modem chip for a low power wireless personal area network (WPAN), an example digital signal processing portion uses 0.5 milliwatts (mW) of power for transmission and reception, whereas an analog signal processing portion may use power of approximately 21 mW in a reception mode, and 30 mW in a transmission mode. Therefore, clearly a considerable portion of the power used by a modem chip in a low power WPAN is dedicated to analog signal processing. Hence, in order to reduce power usage in such a WPAN, it is most likely to be possible to have a meaningful impact on power usage if power saving is directed towards saving power in an analog signal processing portion.

Accordingly, research on reducing power consumption of communication modems by using different RF architectures is being actively conducted to find ways of minimizing power consumption. In particular, a receiver structure using a super-regenerative receiver is configured to amplify an output signal and detect a signal using a positive feedback structure. Such a structure repeatedly amplifies an electronic signal, using the same device. Since a simple RF structure using a relatively fewer number of active devices is adopted in such an approach because a super-regenerative receiver reuses components, such a receiver structure attracts a lot of attention as a candidate to be an ultra low power receiver.

A short distance transmitting and receiving system adopting a low power and low complexity RF structure as just discussed in its operation significantly reduces power consumption. However, such a system may experience performance degradation of the analog signal processing portion because the tradeoffs involved in such complexity and power management approaches potentially cause overall performance degradation in the system.

For example, in some approaches the super-regenerative receiver experiences performance degradation in a system that uses such an approach due to a low selectivity characteristic of a frequency response when using such an architecture.

FIG. 1 is a block diagram illustrating an example of a conventional super-regenerative receiver.

Referring to FIG. 1, an RF signal passes through a low noise amplifier (LNA) 110 and then passes through an RF oscillator 120. For example, the LNA 110 increases the signal strength of the RF signal while minimizing noise, and the RF oscillator transforms the amplified signal into a repetitive, oscillating signal. In this instance, the RF oscillator 120 may be, for example, a super-regenerative oscillator (SRO). The RF oscillator 120 may amplify the RF signal corresponding to a predetermined frequency using a positive feedback loop, as provided in an SRO structure. In such an architecture, when the amplification is continued, an oscillation occurs.

Thus, an operation of stopping the oscillation is required in order to manage the signal oscillation properly. In FIG. 1, a quench oscillator 140 controls periodic generation and termination of the oscillation, so that the oscillation is produced in a way that is appropriate for the rest of the reception process and the oscillation helps to communicate the information that the signal is designated to indicate. For example, in a case in which an on-off keying (OOK) modulation scheme is used for transmitting and receiving the signal, when a transmitting end transmits a signal corresponding to a transmission symbol "1", the RF oscillator 120 generates a relatively strong oscillation signal, albeit controlled by the quench oscillator 140, in response thereto. Because the signal is strong, it is appropriate to designate it as transmitting it as a "1" signal.

By contrast, when the transmitting end transmits a signal corresponding to a transmission symbol "0", the RF oscillator 120 may generate, in practice, a weak oscillation signal due to noise although ideal oscillation is absent.

Here and elsewhere throughout the application, "0" and "1" signals are merely example signals, and similar Boolean values may be used in their place to encode digital information.

Hence, the LNA 110, the RF oscillator 120, and the quench oscillator 140 receive an RF signal and use the RF signal as a basis to generate a signal that represents the information originally represented by the RF signal.

Figure 2:
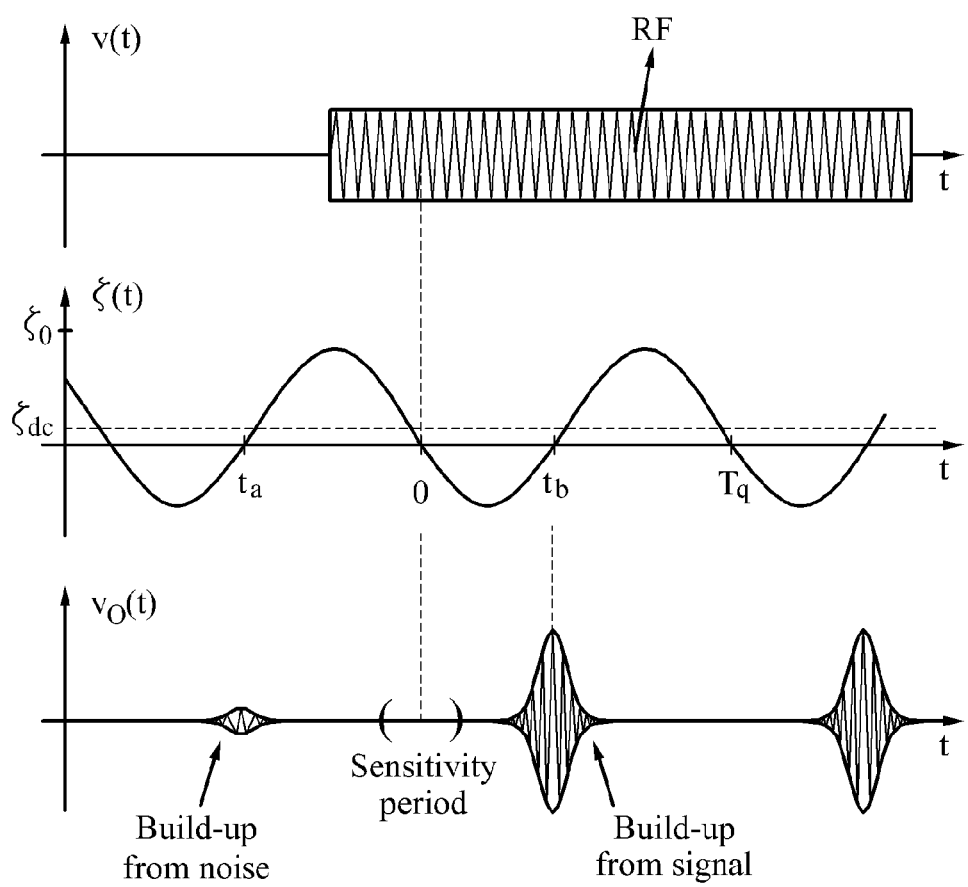
FIG. 2 illustrates examples of an input signal, a damping function, and an output signal of a super-regenerative receiver, according to an embodiment.

An RF signal input to the RF oscillator 120, an output signal, and a damping function of a closed-loop system using the positive feedback loop are illustrated in FIG. 2. These illustrated signals help demonstrate how an RF signal input is processed and transformed during demodulation in an embodiment.

FIG. 1 also illustrates that an envelope detector 130 detects an envelope from the output signal of the RF oscillator 120 to detect a received signal. Such envelope detection by an envelope detector 130 also helps to characterize the information carried by the RF signal input by detection the envelope of the output signal of the RF oscillator 120, to filter out the DC component of the signal. A low-pass filter (LPF) 150 may filter a predetermined area in the detected envelope. For example, the LPF 150 may allow lower frequencies to pass through and attenuate higher frequencies.

In this example, since an output signal of the envelope detector 130 is sometimes a weak signal, such as if the desired transmission symbol is a "0", in such a situation the output signal requires a high-magnitude of amplification to be detectable in a digital base band. In the output signal of the envelope detector 130, the magnitude of amplification may need to be controlled and adjusted based on a distance between a transmitter and a receiver.

For example, the greater the distance between a transmitter and a receiver, the weaker the received signal will be, as radio waves obey an inverse-square law in which the power density of radio waves is proportional to the inverse of the square of distance between the transmitter and the receiver. Thus, the output signal of the envelope detector 130 passes through a variable gain amplifier (VGA) 160 which is configured to amplify a signal by controlling the magnitude of amplification. In this example, such a VGA 160 is configured to compensate for the distance between the transmitter and receiver. However, it is also possible to compensate for other factors that require amplification of the received signal.

In this instance, the VGA 160 amplifies the received signal to have an intensity of at least 40 decibels (dB). When the output signal of the envelope detector 130 includes a direct current (DC) offset component, a signal over-amplified due to the DC offset component potentially saturates an entire circuit. When the circuit is saturated, it is no longer possible to discriminate between "1" signals and "0" signals because regardless of which signal the RF signal was originally designed to communicate, the signal is increased so much during the DC offset process that the circuit cannot reliably tell the difference between a "1" signal and a "0" signal.

In particular, when an OOK demodulation signal passes through the envelope detector 130, an output signal always having a positive value may be obtained, because the envelope detector produces an output signal where values that were intended to transmit a "0" nonetheless appear to always be "1" values.

In FIG. 1, the signal amplified by the VGA 160 to correct for various factors discussed above also passes through an analog-to-digital converter (ADC) 170, and is provided to a physical layer (PHY) (not shown).

FIG. 2 illustrates examples of an input signal, a damping function, and an output signal of a super-regenerative receiver, according to an embodiment.

Referring to FIG. 2, in response to an RF signal v(t) input to an SRO, an output signal $v_o(t)$ of the SRO is provided in a form of an RF pulse series in which oscillation and attenuation are periodically repeated for each quench period $T_q$. Such repeated oscillation and attenuation allow the system to manage and transmit information.

Here, $\zeta(t)$ refers to a damping function of a closed-loop system. $\zeta(t)$ varies in response to a signal of a quench oscillator. When a value of $\zeta(t)$ changes from a positive number to a negative number, an SRO output signal initiates oscillation, and an unstable interval in which an amplitude value gradually increases is started. The unstable interval continued until the value of $\zeta(t)$ changes in sign again, this time from a negative number to a positive number. When the amplitude value reaches a maximum value, a stable interval in which the amplitude value attenuates is initiated.

For example, an RF pulse occurring in an SRO output during a single quench period occurs again during a subsequent quench period. The RF pulse occurring in the SRO output overlaps another RF pulse newly generated during the subsequent quench period, and causes an occurrence of intersymbol interference (ISI). Here, the occurrence of the ISI is referred to as a hangover effect. To eliminate the hangover effect, $\zeta(t)$ may have a value of $\zeta_{dc}$ corresponding to a DC component value. By using $\zeta_{dc}$ to separate out the portion of $\zeta(t)$ that is the DC component, it is possible to consider the DC component and the AC component of the damping function $\zeta(t)$ separately.

As the amplitude value of the RF input signal v(t) increases, the amplitude value of the SRO output $v_o(t)$ also increases. Thus, the signals are amplified together and the SRO output signal $v_o(t)$ becomes an amplified version of the original RF input signal v(t).

A regenerative gain is a main factor in determining the amplitude value of the SRO output $v_o(t)$. The regenerative gain may be determined based on integral values of a sensitive curve and a normalized envelope of the RF signal input to the SRO. Such a regenerative gain processes the RF signal input repeatedly to increase its power, using an architecture such as that provided in FIG. 1.

Referring to the following equations, when the RF input signal of the SRO corresponds to $v(t)=Vp_c(t)\cos(\omega_0 t+\phi)$, the SRO output $v_o(t)$ may be calculated using the equations presented below:

$v_o(t)=VK_0K_sK_rp(t)\cos(\omega_0 t+\phi)$        Equation 1 (SRO Output)

$K_r=\zeta_0\omega_0\int_{t_a}^{t_0} p_c(\tau)s(\tau)d\tau$        Equation 2 (Regenerative Gain)

$s(t)=\exp(\omega_0\int_{t_a}^{t}\zeta(\lambda)d\lambda)$        Equation 3 (Sensitivity Curve)

$p(t)=\exp(-\omega_0\int_{t_b}^{t}\zeta(\lambda)d\lambda)$        Equation 4 (Normalized Envelope)

Here, $p_c(t)$ denotes a pulse envelope of which a maximum value is normalized to "1". Such a pulse envelope may be produced by envelope detector 130. $K_r$ denotes the regenerative gain, s(t) denotes the sensitivity curve, and p(t) denotes the normalized envelope of the SRO output.

For example, an amplitude of the SRO output ($v_o(t)$) is determined based on a value of V corresponding to a peak amplitude of the RF input signal, and integrals that define values of s(t) and $p_c(t)$, as provided in the other equations.

In this example, an increase of the peak amplitude of the RF input signal causes an increase of the peak amplitude of the SRO output, and the peak amplitude of the SRO output is also determined based on an amount of input energy captured based on an overlap level of s(t) and $p_c(t)$.

Figure 3:
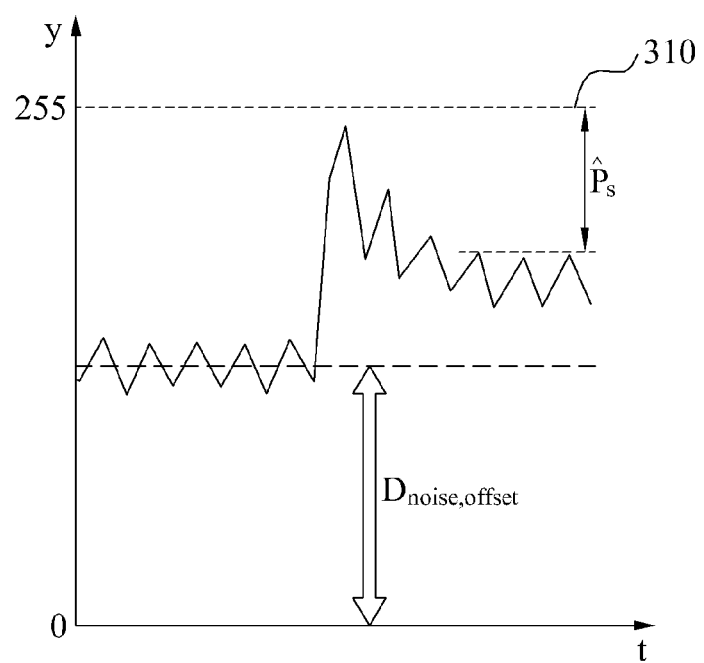
FIG. 3 is a graph illustrating an example of an analog-to-digital converter (ADC) output waveform with respect to a received signal of a super-regenerative receiver, according to an embodiment.

FIG. 3 is a graph illustrating an example of an output waveform of an ADC with respect to a received signal of a super-regenerative receiver, according to an embodiment.

Referring to FIG. 3, when the super-regenerative receiver receives a predetermined transmission signal modulated, such as by using an OOK scheme, the ADC obtains an output waveform of which a dynamic range is from "0" to "255", using 8 bits of resolution. Thus, there are 256 possible values, which correspond to $2^8$ possible values.

For example, an output signal of an envelope detector may always be interpreted to have a positive value. Thus, for such an envelope detector, a VGA is designed to have a frequency response characteristic of eliminating or restricting a low frequency component. By doing so, the VGA, for example, eliminates a DC offset component and maintains a low power.

Accordingly, in such an example, an output signal of the VGA has an average value of "0" and a waveform alternating between a positive value and a negative value centered around the average value of "0" is provided.

Due to a characteristic of mitigating a DC offset as discussed above, in this example, when an identical signal selected from transmission symbols "0" and "1" is continuously received, an output signal of the ADC does not maintain an amplitude of a predetermined transmission signal. Hence, the signal potentially has a tendency 310 to approach an average value, for example, zero volts. Here, the zero volts is an ADC of level 128.

When considering long time period, in some examples the DC offset component is eliminated or unnecessary. However, a DC fluctuation effect, in which a DC offset value changes based on a time during a time period on a signal-by-signal basis, potentially occurs depending on whether a predetermined transmission signal occurs continuously.

In a case of an OOK modulation and demodulation scheme, as discussed above, setting a threshold for determining whether a signal is present potentially has a strong influence on a bit error rate performance. Thus, the characteristic of mitigating a DC offset may distort the output signal of the ADC, for example, an input value of a digital base band and thus, cause performance degradation in the bit error rate. Thus, embodiments use various approaches to help ameliorate this issue.

Figure 4A:
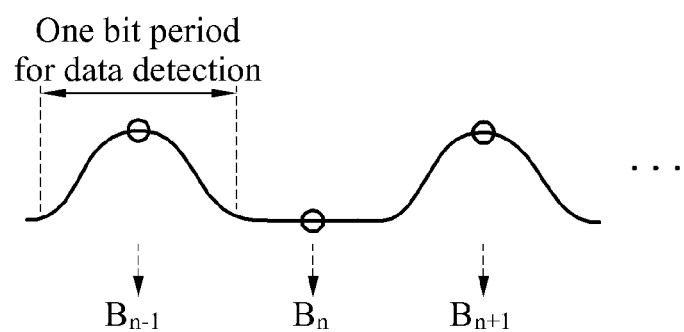
FIGS. 4A through 4C are diagrams illustrating an example of a differential decoding scheme, according to an embodiment.
Figure 4B:
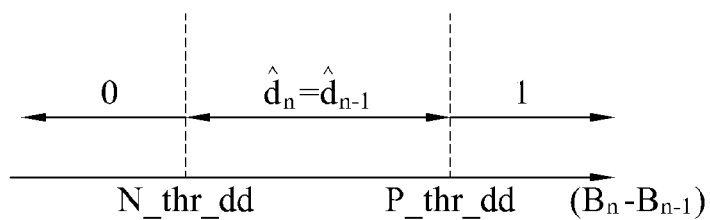
Figure 4C:
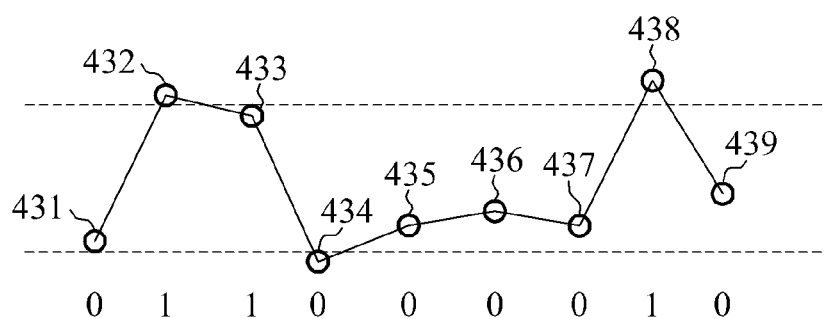

FIGS. 4A through 4C are diagrams illustrating an example of a differential decoding scheme, according to an embodiment.

Referring to FIGS. 4A and 4B, a super-regenerative receiver may receive OOK modulated signals, as discussed above. FIG. 4A illustrates received signals of [1, 0, 1]. That is, in bit period $B_{n-1}$, there is a signal of "1", in bit period $B_n$, there is a signal of "0", and in bit period $B_{n+1}$, there is a signal of "1". When the super-regenerative receiver receives signals, a DC fluctuation effect may occur as described above, which may cause problems in distinguishing between "0" and "1" signals. However, since a signal having a demodulation value of "0" and a signal having a demodulation value of "1" in an appropriately designed embodiment have different intensities, the signals are obviously distinguishable from one another despite the DC fluctuation effect. Thus, when the difference in intensity between the signal having a demodulation value of "0" and the signal having a demodulation value of "1" is used and is sufficient, the signals may be stably demodulated without need of setting a fixed threshold.

FIG. 4B illustrates a differential decoding scheme according to an example embodiment. Such a differential decoding scheme bases the decoding process on changes between signal strengths as the signal varies over time. Thus, the differential decoding scheme refers to a scheme of demodulating a received signal using a difference between a received signal to be demodulated and a preceding signal of the received signal to be demodulated. In such a signal demodulation method according to an example embodiment, the differential decoding scheme is chosen from schemes including a forward-demodulation and backward-demodulation schemes. Such schemes reflect how signals are compared and organized.

In an example, the differential decoding scheme is implemented based on a differential value between the received signal to be demodulated and the preceding signal of the received signal. In this case, and hereinafter, the differential value refers to a difference in intensity between the two signals. When the differential value, as defined above, is less than a first threshold, for example, $(B_n-B_{n-1})<N\_thr\_dd$, a demodulation value of the received signal to be demodulated may be determined as "0". Thus, the signal communicates a "0" value when there is a sufficient decrease in intensity between the signals. Conversely, when the differential value is greater than a second threshold, for example, $P\_thr\_dd<(B_n-B_{n-1})$, the demodulation value of the received signal to be demodulated may be determined as "1". Hence, the signal communicates a "1" value when there is a sufficient increase between signals. In one example the first threshold is a negative number, and the second threshold is a positive number. In an embodiment, an absolute value of the first threshold is equal to or different from an absolute value of the second threshold. Furthermore, the first threshold and the second threshold are potentially set differently for each system. When the differential value is a value between the first threshold and the second threshold, for example, N_thr_dd<$(B_n-B_{n-1})$<P_thr_dd, the demodulation value of the received signal to be demodulated may be determined to be a demodulation value of the preceding signal of the received signal. Here, $\hat{d}_n=\hat{d}_{n-1}$. Thus, overall, if the two signals are sufficiently similar, they will be interpreted as a "0", if they are sufficiently different, they will be interpreted as a "1", and if there is no clear interpretation as a "0" or "1", the next value will replicate the previous value.

FIG. 4C illustrates an example of a differential decoding scheme according to an example embodiment. In FIG. 4C, a super-regenerative receiver receives a signal 431, a signal 432, a signal 433, a signal 434, a signal 435, a signal 436, a signal 437, a signal 438, and a signal 439. Since a differential value between the received signal 432 and the received signal 431 which is a preceding signal of the received signal 432 is greater than a second threshold, a demodulation value of the received signal 432 may be determined as "1". Since a differential value of the received signal 433 is a value between a first threshold and the second threshold, a demodulation value of the received signal 433 may be determined as "1" which is the demodulation value of the received signal 432 which is a preceding signal of the received signal 433. Since a differential value of the received signal 434 is less than the first threshold, a demodulation value of the received signal 434 may be determined as "0". Since differential values of the received signals 435 through 437 are values between the first threshold and the second threshold, a demodulation value of each of the received signals 435 through 437 may be determined as "0" which is a demodulation value of a preceding signal of each of the received signals 435 through 437. Since a differential value of the received signal 438 is greater than the second threshold, a demodulation value of the received signal 438 may be determined as "1". Since a differential value of the received signal 439 is less than the first threshold, a demodulation value of the received signal 439 may be determined as "0".

Figure 5:
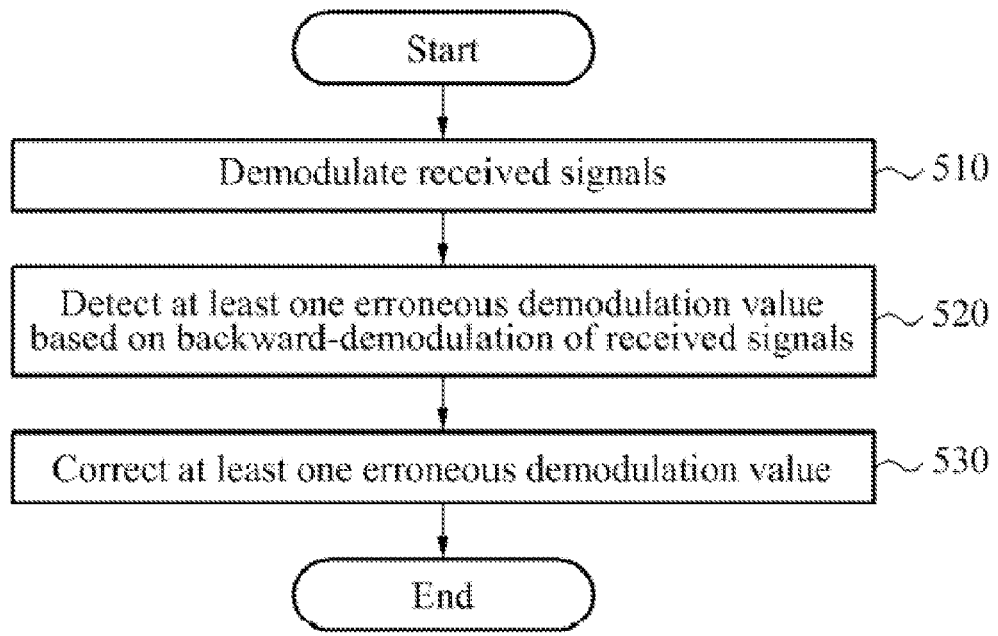
FIG. 5 is a flowchart illustrating an example of a signal demodulation method, according to an embodiment.

FIG. 5 is a flowchart illustrating an example of a signal demodulation method, according to an embodiment.

Referring to FIG. 5, in operation 510, the method demodulates received signals. Depending on a system, the received signals may be forward-demodulated or backward-demodulated. In the signal demodulation method according to an example embodiment, for ease of description, demodulation of the received signals refers to a forward-demodulation hereinafter. However, other embodiments use backward-demodulation in similar ways.

In FIG. 5, although operation 510 is expressed to be performed in advance of operation 520 in one embodiment, in another embodiment operation 510 and operation 520 are performed simultaneously.

In operation 510, received signals are demodulated using the differential decoding scheme presented in FIGS. 4A-4C. In operation 510, when a differential value between a received signal to be demodulated and a preceding signal of the received signal is less than a first threshold, a demodulation value of the received signal to be demodulated may be determined as "0". Conversely, when the differential value is greater than a second threshold, the demodulation value of the received signal to be demodulated may be determined as "1". When the differential value is a value between the first threshold and the second threshold, the demodulation value of the received signal to be demodulated may be determined to be a demodulation value of the preceding signal. Thus, operation 510 uses the same approach for demodulation that is used in FIGS. 4A-4C, as presented above.

In operation 520, the method detects at least one erroneous demodulation value based on a backward-demodulation of the received signals. Here, the backward-demodulation refers to a demodulation performed in a direction opposite to a direction in which the received signals are demodulated in operation 510. In operation 510, an error causing an erroneous demodulation value may occur due to noise, and the error may occur continuously throughout the demodulation process or for a certain time period during demodulation.

As an example, when a differential value of a received signal A to be demodulated is a value between the first threshold and the second threshold, a demodulation value of the received signal A is determined to be a demodulation value of a preceding signal of the received signal A, for example, "0". In this instance, when the differential value of the received signal A becomes greater than the second threshold due to noise, the demodulation value of the received signal A is erroneously determined to have a demodulation value of "1".

Thus, when differential values of subsequently received signals are values between the first threshold and the second threshold, demodulation values of the subsequently received signals are to be determined as "0". However, the demodulation values of the subsequently received signals are erroneously assigned a demodulation value of "1" since the demodulation value of the received signal A was erroneously determined to have a demodulation value of "1".

Even though noise occurs in the received signal, one of a demodulation value obtained by forward-demodulating the received signal and a demodulation value obtained by backward-demodulating the received signal may be normally demodulated without being interfered by the noise, by comparing demodulation values to ensure that any errors introduced into the signal by noise are corrected for. As described above, when the differential value of the received signal A increases due to the presence of noise, an error that causes erroneous demodulation value potentially occurs. In this example, when the backward-demodulation is performed, the demodulation value of the received signal A may be free from the interference of the noise and thus, a normal demodulation value may be obtained.

Operation 520 may be performed with respect to all of the received signals or a portion of the received signals, in order to detect errors for subsequent correction. A further description of operation 520 will be provided with reference to FIGS. 6 and 7 through various examples.

In operation 530, the method corrects the at least one erroneous demodulation value. The demodulation value may be determined as "0" or "1", and the at least one erroneous demodulation value may have an erroneous demodulation value, in lieu of a normal demodulation value. Thus, the at least one erroneous demodulation value may be changed or modified to a value differing from a current value.

When at least one erroneous demodulation value is detected in a forward-demodulation of received signals, the at least one erroneous demodulation value is changed to a demodulation value obtained by backward-demodulating a corresponding received signal. Similarly, when at least one erroneous demodulation value is detected in a backward-demodulation of received signals, the at least one erroneous demodulation value may be changed to a demodulation value obtained by forward-demodulating a corresponding received signal.

Figure 6:
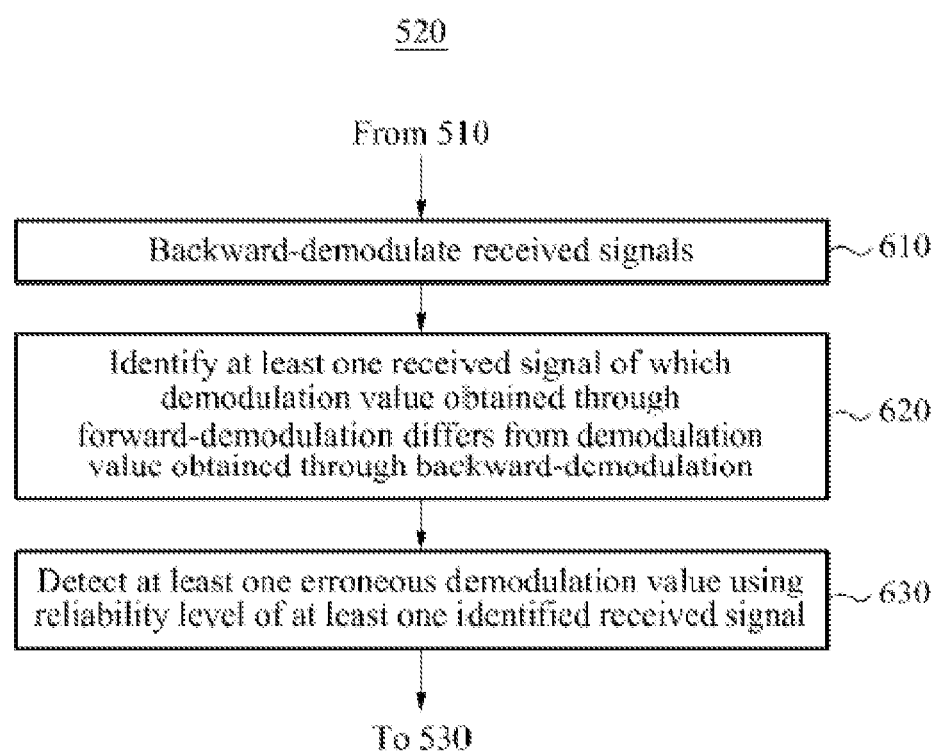
FIG. 6 is a flowchart illustrating an example of operation 520 of FIG. 5, according to an embodiment.

FIG. 6 is a flowchart illustrating an example of operation 520 of FIG. 5, according to an embodiment.

Referring to FIG. 6, in operation 610, the method performs backward-demodulation on received signals. Here, "backward" refers to a direction opposite to a direction in which demodulation is performed in operation 510 of FIG. 5. Thus is operation 510 demodulates forward, operation 610 demodulates backwards, and vice versa. In operation 610, the backward-demodulation may be performed with respect to all of the received signals or a portion of the received signals.

In operation 620, the method identifies at least one received signal of which a demodulation value obtained through forward-demodulation differs from a demodulation value obtained through backward-demodulation from the received signals. If the signals differ, it indicates that there may be a potential error, so appropriate follow-up and analysis are necessary. When the demodulation is normally performed and lacks errors, the demodulation value obtained through forward-demodulation may be equal to the demodulation value obtained through backward-demodulation. However, when an error occurs in one of the demodulation value obtained through forward-demodulation and the demodulation value obtained through backward-demodulation, the demodulation value obtained through forward-demodulation sometimes differs from the demodulation value obtained through backward-demodulation. Hence, embodiments detect and correct such errors in order to ensure that the demodulation is accurate.

In operation 620, the at least one received signal of which the demodulation value obtained through forward-demodulation differs from the demodulation value obtained through backward-demodulation is identified by comparing the demodulation value obtained through forward-demodulation to the demodulation value obtained through backward-demodulation.

In operation 630, the method detects at least one erroneous demodulation value using a reliability level of the at least one identified received signal. For example, one of the demodulation values obtained through forward-demodulation and the demodulation value obtained through backward-demodulation is detected as being a normal demodulation value.

Thus, a demodulation value having a high reliability level among the demodulation values may be detected to be the normal demodulation value. For example, the reliability information may be information that characterizes which of the potential values should be taken as the normal, valid demodulation value. Here, the reliability level may be preset to be a difference in intensity between a received signal and a preceding signal of the received signal, a square of the difference in intensity, and the like, depending on a system. Essentially, the reliability level is some metric that can be taken to be indicative of how likely information in a given signal is to be a true representation of the information to be demodulated, and how much should be interpreted as potential noise or other invalid information.

In an example embodiment, the at least one erroneous demodulation value is detected using a reliability level of an initially received signal and a reliability level of a lastly received signal among the at least one identified received signal. For example, when a difference in intensity between the initially received signal and a preceding signal of the initially received signal is less than a difference in intensity between the lastly received signal and a preceding signal of the lastly received signal, the reliability level of the initially received signal is interpreted as being less than the reliability level of the lastly received signal. From this, the embodiment infers that an error occurs in a demodulation value obtained by forward-demodulating the at least one identified received signal. Thus, the demodulation value obtained by forward-demodulating the at least one identified received signal is detected to be the at least one erroneous demodulation value. A similar example operates to indicate that the backwards-demodulation is to be used.

Figure 7:
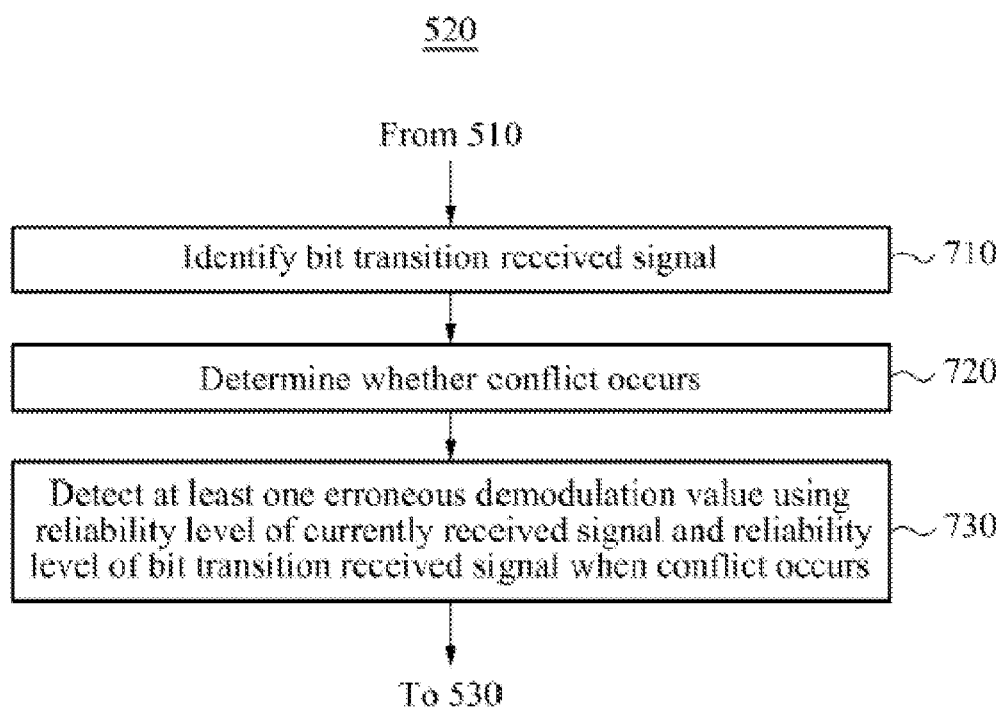
FIG. 7 is a flowchart illustrating another example of operation 520 of FIG. 5, according to an embodiment.

FIG. 7 is a flowchart illustrating another example of operation 520 of FIG. 5, according to an embodiment.

Referring to FIG. 7, in operation 710, the method identifies a bit transition received signal. Here, the bit transition received signal refers to a received signal of which a demodulation value of a received signal to be demodulated differs from a demodulation value of a preceding signal of the received signal. Because there is a difference between these demodulation values, such a situation is referred to as a bit transition, because there is a transition or change in the value of the bit in question. For example, in operation 510 of FIG. 5, the received signal may be demodulated using the differential decoding scheme, as discussed above. As discussed above, in such a differential decoding scheme, the received signal is demodulated into information based on characteristics of how the signal changes.

For example, when the differential value between the received signal to be demodulated and the preceding signal of the received signal is less than the first threshold, the demodulation value of the received signal to be demodulated is determined as a "0" value. Conversely, when the differential value is greater than the second threshold, the demodulation value of the received signal to be demodulated is determined as "1". In operation 510 of FIG. 5, when the demodulation value of the received signal to be demodulated is determined as a "1" or as a "0", a transition is performed from the demodulation value of the preceding signal to the demodulation value of the received signal to be demodulated. In operation 710, when the demodulation value of the received signal to be demodulated differs from the demodulation value of the preceding signal of the received signal, the received signal to be demodulated is determined to be a bit transition received signal, as such a change is indicative of a bit transition.

When the bit transition received signal is determined, an index and a differential value of the bit transition received signal are stored in a memory. Such information is stored to help in the error correction process. Here, the index of the bit transition received signal refers to an identifier of the bit transition received signal. Such an index helps identify which part of the signal is relevant to the bit transition. For example, the index of the bit transition received signal may include an order in which the bit transition received signal is received, or other appropriate identifying information that indicates when the bit transition occurred. The differential value of the bit transition received signal refers to a value of the difference in intensity between the bit transition received signal and a preceding signal of the bit transition received signal. Such a differential value is information that is used by embodiments to establish, based on the magnitude of the differential value, which information the bit transition is intended to communicate. As the communication process continues, an index and a differential value of a previous bit transition received signal are updated with the index and the differential value of the bit transition received signal. For example, information associated with recent bit transitions of received signal is stored in the memory and thus, overall operations and memory allocations in a system may be reduced by maintaining recent data in working memory for processing and manipulation.

In operation 720, the method makes a determination as to whether a conflict occurs. Here, in an example, the conflict is defined as a case in which a bit transition from the demodulation value of the preceding signal of the received signal to the demodulation value of the received signal is not performed although the differential indicates that such transition is to be performed.

In operation 720, when a differential value of a currently received signal is less than the first threshold or is greater than the second threshold, whether a demodulation value of the currently received signal is equal to a demodulation value of a preceding signal of the currently received signal is identified. If a differential value of a currently received signal is less than the first threshold or is greater than the second threshold, that indicates that a bit transition should occur and there should be a change in the demodulated value. In such a case, when the demodulation value of the currently received signal is equal to the demodulation value of the preceding signal, it is determined that a conflict occurs, because there is an indication that there should be a bit transition, but the actual demodulated signal does not reflect such a transition.

In operation 510 of FIG. 5, when normal performance of the differential decoding occurs, and the differential value of the currently received signal is less than the first threshold, the demodulation value of the currently received signal is determined as "0" and thus, the demodulation value of the currently received signal represents a change in demodulation value from "1", which is the demodulation value of the preceding signal, to "0". Conversely, when abnormal performance of the differential decoding occurs, and the differential value of the currently received signal is greater than the second threshold, the demodulation value of the currently received signal is determined as "1" and thus, the demodulation value of the currently received signal represents a change from "0", which is the demodulation value of the preceding signal, to "1". In this case, it may be determined that a conflict occurs.

In operation 510 of FIG. 5, when normal performance of the differential decoding occurs, and the differential value of the currently received signal is less than the first threshold, the demodulation value of the currently received signal may be maintained as "0" which is the demodulation value of the preceding signal. Conversely, when abnormal performance of the differential decoding occurs, and the differential value of the currently received signal is greater than the second threshold, the demodulation value of the currently received signal may be maintained as "1" which is the demodulation value of the preceding signal. In this case, it may be determined that a conflict occurs.

When the conflict occurs, the method detects and corrects at least one erroneous demodulation value is using a reliability level of the bit transition received signal and a reliability level of the currently received signal, in operation 730. Here, the reliability level may be preset, depending on a system and its intended uses, to be a difference in intensity between the currently received signal and a preceding signal of the received signal, a square of the difference in intensity, and the like. Such a reliability level is indicative of just how different the currently received signal and the preceding signal need to be, based upon an intensity difference or a related metric. For example, when the reliability level is set to be the differential value, the differential value of the bit transition received signal, as determined above, is compared to the differential value of the currently received signal. Based on a result of the comparing, the at least one erroneous demodulation value may be detected.

In an example embodiment, in a case in which the conflict occurs, as discussed with relation to FIG. 7, when the differential value of the currently received signal is greater than the differential value of the bit transition received signal, the reliability level of the currently received signal is higher than the reliability level of the bit transition received signal. Hence, if the reliability level of the currently received signal is higher than the reliability level of the bit transition received signal, an embodiment determines that the differential decoding is abnormally performed on each received signal, starting from the bit transition received signal to a preceding signal of the currently received signal. Thus, the demodulation value obtained through forward-demodulation may be determined to be the erroneous demodulation value. In this case, in operation 530 of FIG. 5, the demodulation value obtained through forward-demodulation may be changed to the demodulation value obtained through backward-demodulation in order to correct errors in the demodulated information.

In another example embodiment, in a case in which the conflict occurs, the differential value of the currently received signal is determined to be less than the differential value of the bit transition received signal, and hence the reliability level of the currently received signal is lower than the reliability level of the bit transition received signal. Therefore, an embodiment determines that the differential decoding is normally performed on each received signal, starting from the bit transition received signal to a preceding signal of the currently received signal. Thus, the demodulation value obtained through forward-demodulation may be determined to be a normal demodulation value, and there is no need to use correction techniques to correct the demodulation value.

Figure 8A:
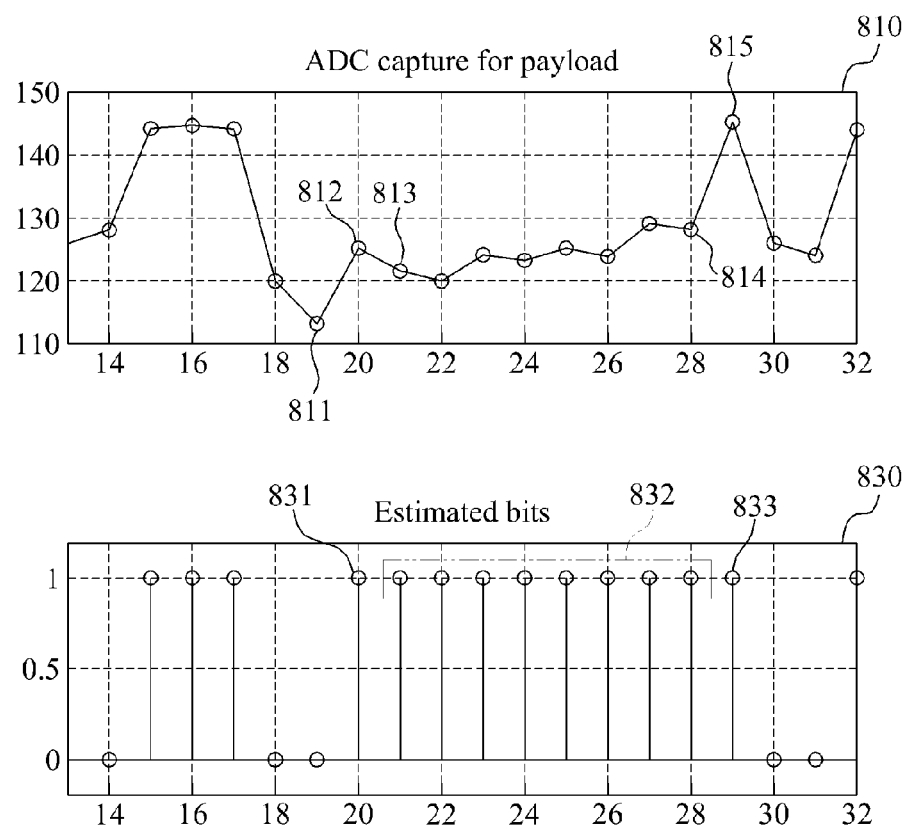
FIGS. 8A and 8B are graphs illustrating an example of a signal demodulation method, according to an embodiment.
Figure 8B:
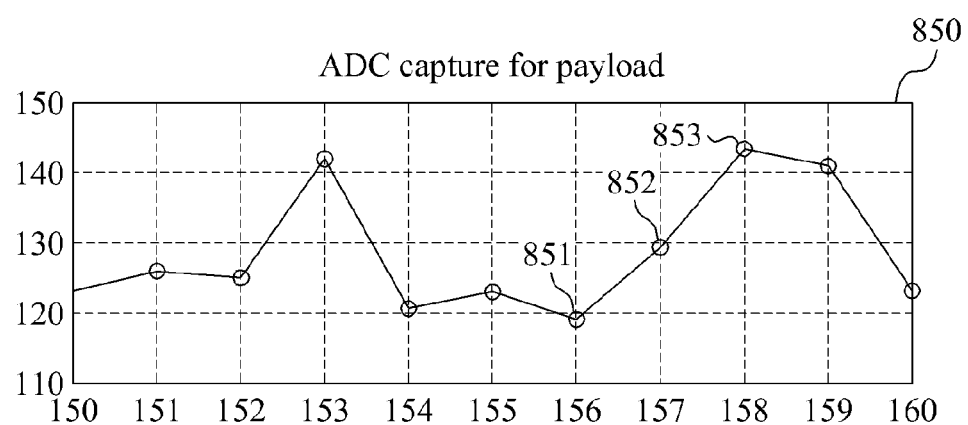
Figure 8B:
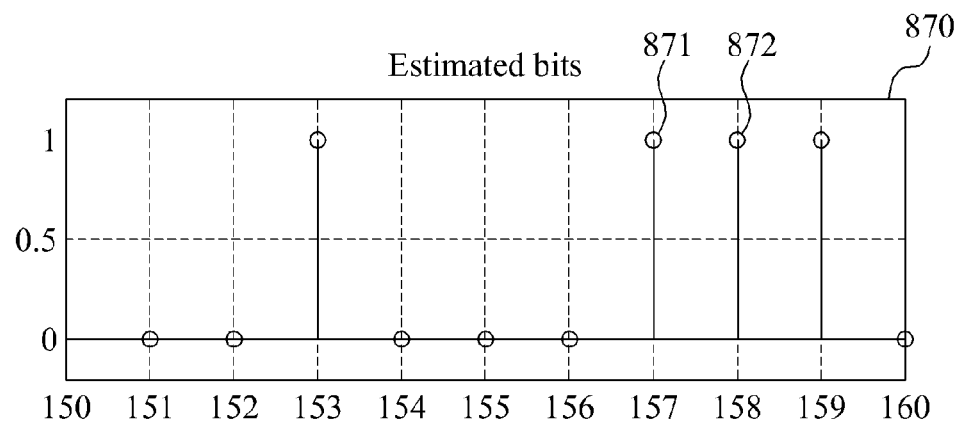

FIGS. 8A and 8B are graphs illustrating an example of a signal demodulation method, according to an embodiment.

Referring to FIG. 8A, a graph 810 indicates ADC outputs of received signals, and a graph 830 indicates demodulation values of the received signals. In this example, an intensity of a received signal 812 increases due to noise. Because of this increase due to noise, when the received signal 812 is forward-demodulated, a differential value between the received signal 812 and a received signal 811 which is a preceding signal of the received signal 812 becomes greater than a second threshold, for example, P_thr_dd, due to the noise, rather than being a deliberate change in signal strength designed to communicate information. Thus, in this example, a demodulation value 831 of the received signal 812 is determined to be an erroneous demodulation value of "1". In this example, a transition is performed from a demodulation value of the received signal 811 to the demodulation value 831 of the received signal 812. Accordingly, the received signal 812 is determined to be a bit transition received signal, and an index and a differential value of the received signal 812 may be stored as [20, 9], because 20 indicates when the change occurs, and 9 indicates the amount of change.

As illustrated in graph 810, all differential values of a received signal 813 through a received signal 814 are greater than a first threshold, for example, N_thr_dd, or less than the second threshold, for example, P_thr_dd. Thus, demodulation values 832 of the received signal 813 through the received signal 814 may be determined as "1" which is the demodulation value 831 of the received signal 812. In a normal manner, the demodulation value 831 of the received signal 812 is "0". However, due to noise, the demodulation value 831 of the received signal 812 is determined to be the erroneous demodulation value of "1". When all of the demodulation values 832 of the received signal 813 through the received signal 814 are determined to be the erroneous demodulation values, error propagation occurs and the signal is not transmitted correctly or reliably.

Since a differential value of a currently received signal 815 is greater than the second threshold, for example, P_thr_dd, a demodulation value 833 of the currently received signal 815 is determined as "1". In a normal manner, when the demodulation value 833 of the currently received signal 815 is determined as "1", a transition may be performed from the demodulation value of the received signal 814 corresponding to a preceding signal of the currently received signal 815 to the demodulation value 833 of the received signal 815. In the graph 830, since the demodulation value 833 of the currently received signal 815, which was previously determined to be a "1" is equal to the demodulation value 832 of the received signal 814, which is determined to be a "1" based on the differential value, it is determined that a conflict occurs.

When the conflict occurs, the differential value of the currently received signal 815 may be compared to the differential value of the received signal 812, which is determined to be the bit transition received signal, as discussed above. By comparing the differential values, it becomes possible to determine which signal transition is intentional and which should be considered to be noise. In an example of FIG. 8A, the differential value of the currently received signal 815 is "16", and the differential value of the received signal 812 is "9". Since the differential value of the currently received signal 815 is greater than the differential value of the received signal 812, it may be determined that a reliability level of the currently received signal 815 is higher than a reliability level of the received signal 812. That is, because there is a larger differential for the currently received signal 815 as compared to the received signal 812, it is less likely to be attributable to noise and hence should be used to reduce error. Thus, the demodulation values of the received signal 812 through the received signal 814, which is a preceding signal of the currently received signal 815, are determined to be erroneous demodulation values. To correct the demodulation values of the received signal 812 through the received signal 814, for example, [1, 1, 1, 1, 1, 1, 1, 1], the demodulated values are changed to other demodulation values, for example, [0, 0, 0, 0, 0, 0, 0, 0, 0], and the erroneous demodulation values are thus corrected.

Referring to FIG. 8B, a graph 850 indicates ADC outputs of received signals, and a graph 870 indicates demodulation values of the received signals, in another example. This example illustrates how a differential value of a received signal 852 becomes greater than a second threshold, for example, P_thr_dd, due to noise. Thus, a demodulation value 871 of the received signal 852 may be determined to be the erroneous demodulation value of "1". As shown in FIG. 8B, a transition is performed from a demodulation value of a received signal 851 corresponding to a preceding signal of the received signal 852 to the demodulation value 871 of the received signal 852. Accordingly, the received signal 852 may be determined to be a bit transition received signal, and an index and a differential value of the received signal 852 may be stored as [157, 10] in a memory, in a manner analogous to the behavior illustrated in FIG. 8A.

In FIG. 8B, since a differential value of a currently received signal 853 is greater than the second threshold, for example, P_thr_dd, a demodulation value 872 of the currently received signal 853 is determined as a "1". Since a transition is not performed from the demodulation value 871 of the received signal 852 corresponding to a preceding signal of the currently received signal 853 to the demodulation value 872 of the currently received signal 853, as both demodulation value 871 and demodulation value 872 are interpreted to be a "1", it may be determined that a conflict occurs. In this instance, the differential value of the currently received signal 853 is "13", and the differential value of the received signal 852 determined to be the bit transition received signal is "10". Since the differential value of the currently received signal 853 is greater than the differential value of the received signal 852, a reliability level of the currently received signal 853 is considered to be higher than a reliability level of the received signal 852, in a manner similar to the analogous decision-making process of FIG. 8A. Thus, the demodulation value 871 of the received signal 852 may be determined to be an erroneous demodulation value. The demodulation value 871 of the received signal 852 may be changed from "1" to "0" and thus, the demodulation value 871 which is determined to be an erroneous demodulation value is corrected.

Figure 9:
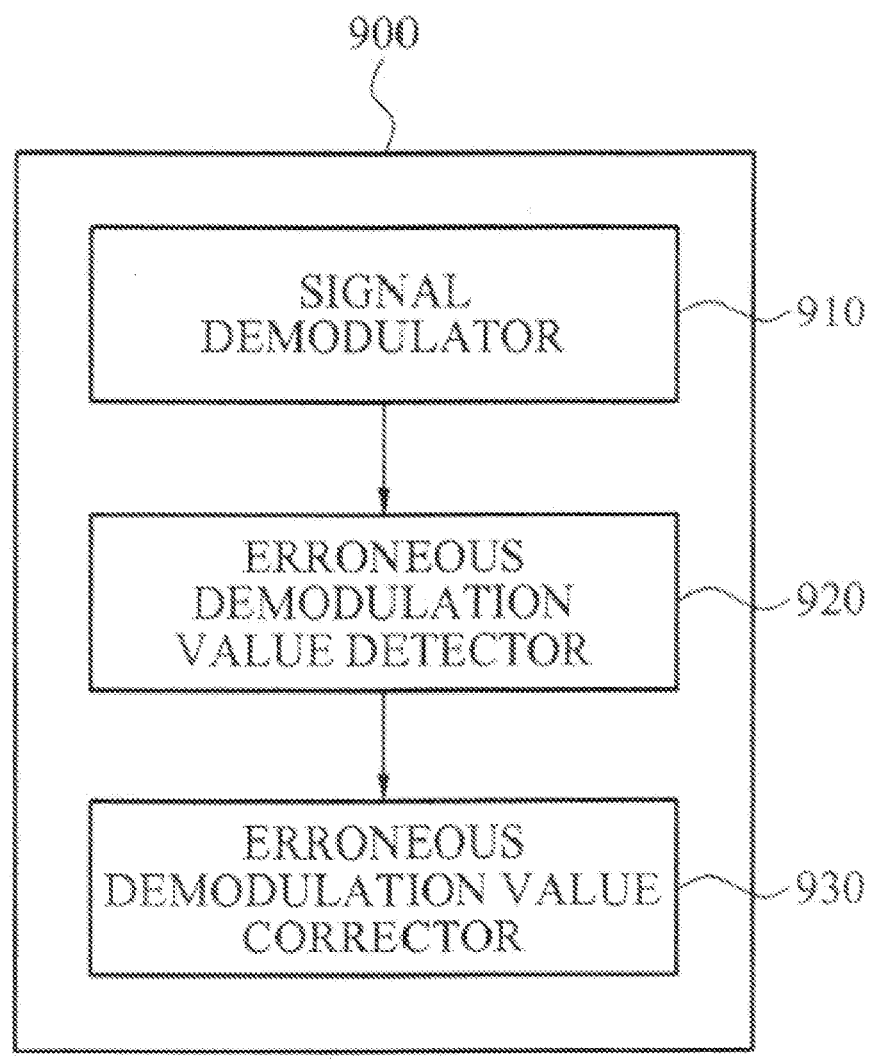
FIG. 9 is a block diagram illustrating an example of a signal demodulation apparatus, according to an embodiment.

FIG. 9 is a block diagram illustrating an example of a signal demodulation apparatus 900, according to an embodiment.

Referring to FIG. 9, the signal demodulation apparatus 900 includes a signal demodulator 910, an erroneous demodulation value detector 920, and an erroneous demodulation value corrector 930.

The signal demodulator 910 demodulates received signals using a difference between a received signal to be demodulated and a preceding signal of the received signal. The way in which the signal demodulator 910 performs such demodulation is discussed further, above.

The erroneous demodulation value detector 920 detects at least one erroneous demodulation value based on a backward-demodulation of the received signals. The way in which the erroneous demodulation value detector 920 performs such detection is discussed further, above.

The erroneous demodulation value corrector 930 corrects the at least one erroneous demodulation value. The way in which the erroneous demodulation value correction 920 performs such correction is discussed further, above.

For example, descriptions about FIGS. 1 through 8B presented above are applicable to the signal demodulation apparatus 900 of FIG. 9 and thus, further descriptions will be omitted for conciseness.

The examples of a method and apparatus for stable signal demodulation in a communication system may provide a way to improve the accuracy of demodulation while minimizing power usage and complexity.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A signal demodulation method, comprising:
    demodulating received signals using a difference between a received signal to be demodulated and a preceding signal of the received signal;
    detecting an erroneous demodulation value based on backward-demodulation of the received signals; and
    correcting the erroneous demodulation value,
    wherein the detecting comprises:
    identifying, from the received signals, a correct signal of which a demodulation value obtained through forward-demodulation is the same as a demodulation value obtained through backward-demodulation; and
    detecting that the demodulation value is correct when the identifier identifies a correct signal.

2. The method of claim 1, wherein the demodulating comprises:
    determining a demodulation value of the received signal to be demodulated as a first demodulation value when a differential value is less than a first threshold, the differential value corresponding to a difference between an intensity of the received signal to be demodulated and an intensity of the preceding signal;
    determining the demodulation value of the received signal to be demodulated as a second demodulation value when the differential value is greater than a second threshold; and
    determining the demodulation value of the received signal to be demodulated to be a demodulation value of the preceding signal when the differential value is a value between the first threshold and the second threshold.

3. A signal demodulation apparatus, comprising:
a signal demodulator configured to demodulate received signals using a difference between a received signal to be demodulated and a preceding signal of the received signal;
an erroneous demodulation value detector configured to detect an erroneous demodulation value based on a backward-demodulation of the received signals; and
an erroneous demodulation value corrector configured to correct the erroneous demodulation value,
wherein the erroneous demodulation value detector comprises:
a backward demodulator configured to backward-demodulate the received signals;
an identifier configured to identify, from the received signals, a correct signal of which a demodulation value obtained through forward-demodulation is the same as a demodulation value obtained through backward-demodulation; and
a detector configured to detect that the demodulation value is correct when the identifier identifies a correct signal.

4. The apparatus of claim 3, wherein the signal demodulator is configured to:
determine a demodulation value of the received signal to be demodulated as a first demodulation value when a differential value is less than a first threshold, the differential value corresponding to a difference between an intensity of the received signal to be demodulated and an intensity of the preceding signal,
determine the demodulation value as a second demodulation value when the differential value is greater than a second threshold, and
determine the demodulation value of the received signal to be demodulated to be a demodulation value of the preceding signal when the differential value is a value between the first threshold and the second threshold.

5. A signal demodulation apparatus, comprising:
a signal demodulator configured to demodulate received signals using a difference between a received signal to be demodulated and a preceding signal of the received signal;
an erroneous demodulation value detector configured to detect that the demodulation value is correct, based on a backward-demodulation of the received signals; and
an erroneous demodulation value corrector configured to output that the demodulated value is correct
wherein the erroneous demodulation value detector comprises:
a backward demodulator configured to backward-demodulate the received signal;
an identifier configured to identify, from the received signals, a correct signal for which a demodulation value obtained through forward-demodulation is the same as a demodulation value obtained through backward-demodulation; and
a detector configured to detect that the demodulation value is correct when the identifier identifies a correct signal.

6. The apparatus of claim 5, wherein the signal demodulator is configured to:
determine a demodulation value of the received signal to be demodulated as a first demodulation value when a differential value is less than a first threshold, the differential value corresponding to a difference between an intensity of the received signal to be demodulated and an intensity of the preceding signal,
determine the demodulation value as a second demodulation value when the differential value is greater than a second threshold, and
determine the demodulation value of the received signal to be demodulated to be a demodulation value of the preceding signal when the differential value is a value between the first threshold and the second threshold.

* * * * *